United States Patent
Biraben et al.

(10) Patent No.: US 9,452,811 B2
(45) Date of Patent: Sep. 27, 2016

(54) SUPPORT STRUCTURE FOR AT LEAST TWO HOISTABLE MASTS, ESPECIALLY FOR A SUBMARINE VEHICLE

(75) Inventors: Stephanie Biraben, Angouleme (FR); Fabien Foucaud, Brie (FR)

(73) Assignee: DCNS, Paris (FR)

( * ) Notice: Subject to any disclaimer, the term of this patent is extended or adjusted under 35 U.S.C. 154(b) by 137 days.

(21) Appl. No.: 13/824,714

(22) PCT Filed: Jun. 29, 2012

(86) PCT No.: PCT/EP2012/062746
§ 371 (c)(1),
(2), (4) Date: Aug. 25, 2014

(87) PCT Pub. No.: WO2013/004628
PCT Pub. Date: Jan. 10, 2013

(65) Prior Publication Data
US 2014/0366795 A1    Dec. 18, 2014

(30) Foreign Application Priority Data

Jul. 1, 2011  (FR) ...................................... 11 55964

(51) Int. Cl.
*B63G 8/38*    (2006.01)
*G02B 23/08*   (2006.01)

(52) U.S. Cl.
CPC ................. *B63G 8/38* (2013.01); *G02B 23/08* (2013.01)

(58) Field of Classification Search
CPC .................................. B63G 8/38; G02B 23/08
USPC ........................................................... 114/90
See application file for complete search history.

(56) References Cited

FOREIGN PATENT DOCUMENTS

| DE | 103 57 226 B3 | 3/2005 |
| EP | 0 546 321 A1 | 6/1993 |
| EP | 0 711 702 A1 | 5/1996 |
| EP | 1 177 974 A2 | 2/2002 |

*Primary Examiner* — Stephen Avila
(74) *Attorney, Agent, or Firm* — Knobbe, Martens, Olson & Bear, LLP

(57) ABSTRACT

A support and guidance structure includes a support equipped with a guidance device configured to guide at least two masts in translation in a raising direction. The support delimits a respective housing for each of the masts, and a fixation device is configured to fix the support and guidance structure to a structural part of the underwater vehicle. Each housing is open, on all planes perpendicular to the raising direction.

11 Claims, 2 Drawing Sheets

SUPPORT STRUCTURE FOR AT LEAST TWO HOISTABLE MASTS, ESPECIALLY FOR A SUBMARINE VEHICLE

FIELD OF THE INVENTION

This invention concerns raisable masts for underwater vehicles, also known as periscopic masts. Such raisable masts are generally used to carry means of communication for the underwater vehicle, such as radio transmitter/receiver antennas, and/or to carry means of exploration or detection of the environment of the underwater vehicle, such as radar antennas, sensors, or periscopes.

BACKGROUND OF THE INVENTION

A raisable mast support including means of guidance of the mast in translation in a direction of raising, allowing for longitudinal raising of the mast between a retracted position inside the body and a raised position. These guiding means only allow the mast to move in this raising direction, although they also allow the mast to be kept on the support.

The support also includes means of fixation to a structural component of the underwater vehicle, also referred to as the body. Thus, the mast and its support may be brought together during a single assembly operation within the underwater vehicle.

Normally, the support includes four walls surrounding the mast transversely to the raising direction, so as to form a housing for the mast. Thus, when the underwater vehicle includes several masts of this type, each mast is surrounded by four respective walls, although the walls and supports, taken as a whole, are relatively cumbersome.

The invention seeks, in particular, to remedy this disadvantage by providing a less cumbersome support and guidance structure, whilst providing good resistance to environmental constraints.

SUMMARY OF THE INVENTION

To this end, the invention concerns, in particular, a support and guidance structure for raisable masts of an underwater vehicle, including:
  a support equipped with means of guidance in translation in a raising direction for at least two masts, delimiting a respective housing for each of these masts, and
  means of affixing the support on a structural part of the underwater vehicle, characterised in that each housing is open, on substantially all planes perpendicular to the raising direction, in a second direction perpendicular to this raising direction.

The support structure according to the invention delimits a plurality of open housings, although it is less cumbersome than one or more supports having walls that surround the masts.

Furthermore, the invention proposes the use of a common support for several masts, although it allows for bringing a plurality of masts into the underwater vehicle in a single mounting operation.

Optionally, an assembly according to the invention includes one or more of the following characteristics, taken alone or in all technically possible combinations:
  the support and guidance structure includes at least one central post, and two lateral posts, whereby the central and lateral post are aligned, in a horizontal direction perpendicular to the raising direction and to the second direction, whereby each pair of adjacent posts delimits one of the aforementioned housings;
  the support and guidance structure further includes at least two walls, each extending between a pair of adjacent posts;
  each wall has a first surface, bearing means of guidance in translation of a mast, and a second surface, opposite the first, bearing means of guidance in translation of another mast;
  each central post includes means of guidance in translation for at least three masts, preferably for four masts;
  each lateral post includes means of guidance in translation for at least one masts, preferably for two masts;
  the fixation means includes mount brackets, each having a first end integrated with the support, and a second, free, end, to be affixed to the structural part of the underwater vehicle.

The invention also concerns an assembly of a support and guidance structure and at least two raisable masts, in which each guidance means includes a guide rail, arranged on the support and extending in the raising direction, and in which each mast has, for each guide rail of the mast, at least one additional guide element to operate in tandem with the rail.

The invention lastly concerns an underwater vehicle including a structural part for receiving at least one raisable mast, and an assembly in which the support is affixed to this structural part.

BRIEF DESCRIPTION OF THE DRAWINGS

The invention will be better understood based on the following description, provided by way of example only, referring to the attached drawings, in which:

FIG. 1 shows an assembly 10 including at least two, e.g., three, masts 12 and one common support 14 for these masts 12. The assembly 10 is to be placed on a structural part 15, also known as the body, of an underwater vehicle, e.g., of the Andrasta class.

Figure 1:
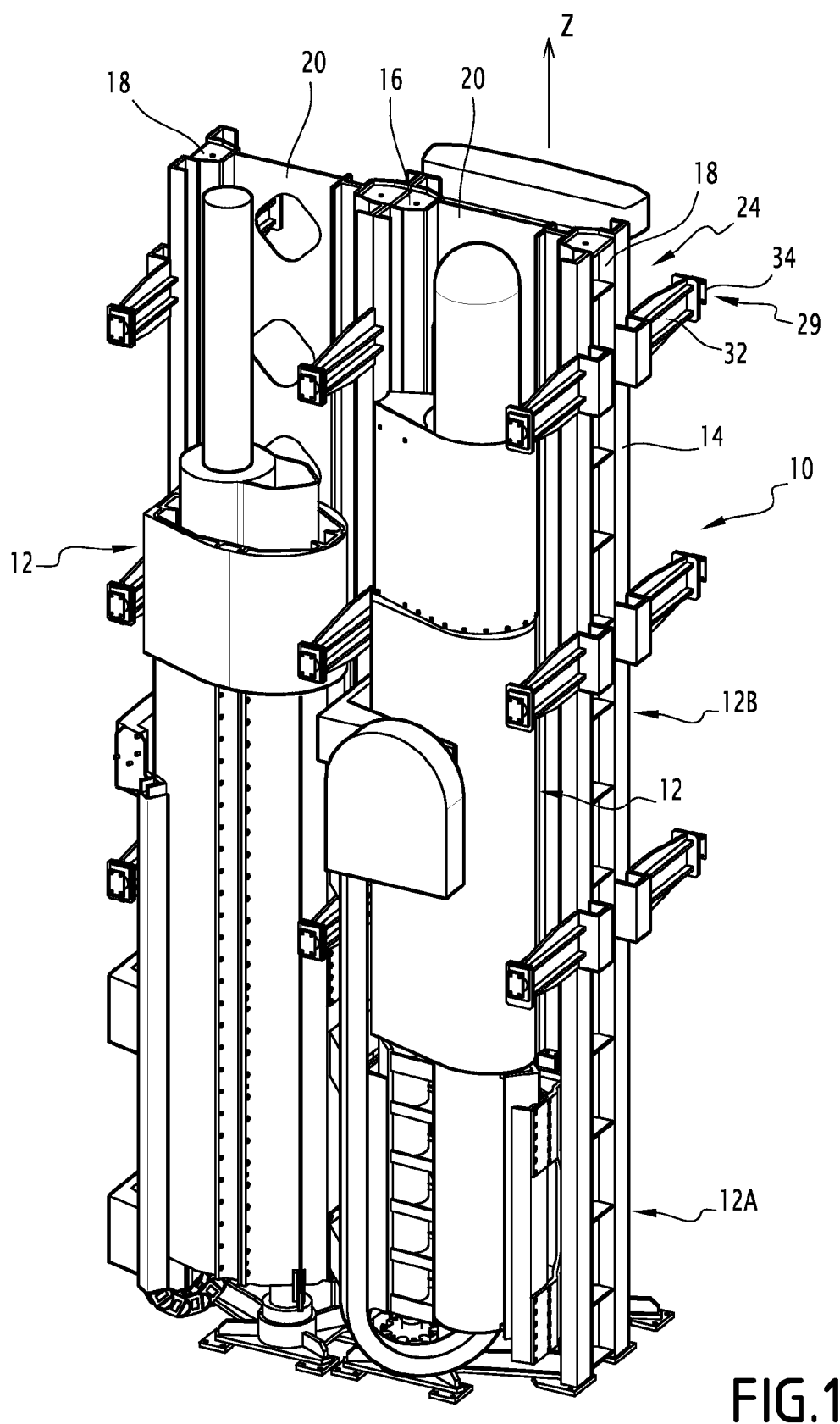
FIG. 1 is a perspective view of an assembly of masts and their common support, according to an exemplary embodiment of the invention.

Preferably, each mast 12 includes a first part 12A, to be connected to the support 14 as described below, and a second part 12B, integrated with the first 12A, having means of operation. These means of operation include, e.g., means of communication, such as a radio transmitter and/or receiver antenna, means of exploration of the environment of the underwater vehicle, such as a radar antenna, a sensor, or a periscope, an armoured turret, or any other equipment capable of being integrated into a mast of an underwater vehicle.

In accordance with the above embodiment, the support 14 includes a central post 16 and two lateral posts 18, aligned with the central post 16, in a horizontal direction X.

The support 14 also includes two walls 20, each extending between the central post 16 and a respective adjacent lateral post 18.

Each wall 20 has a first surface 20A and a second surface 20B opposite the first. Each of these surfaces 20A, 20B delimits, together with the pair of posts 16, 18, between which the wall 20 extends, a housing 22 for a respective mast 12.

The mast 12 is connected to the support 14 by means of the means 24 of guidance of the mast in translation in a vertical raising direction Z, for raising and lowering this mast 12.

The guidance means 24 include, e.g., guide rails 26, borne by the support 14 and extending in the raising direction Z. In this case, each mast 12 includes, for each guide rail 26, at least one additional guidance element 28 to operate in tandem with this rail 26. Preferably, the guidance elements 28 are borne by the first part 12A of the mast 12.

Preferably, the guidance means 24 of each mast 12 include at least two guide rails 26, arranged opposite one another, in order to block any degree of freedom of movement of the mast 12 transverse to the raising direction Z.

According to the embodiment described, the central post 16 includes means of guidance 24 in translation for at least three masts 12, preferably for four masts. Additionally, each lateral post 18 includes means of guidance 24 for at least one mast in the raising direction Z, preferably for two masts 12. Lastly, the first surface 20A of each wall 20 bears means of guidance 24 in translation of a mast 12, and the second surface 20B of each wall bears means of guidance in translation of another mast 12.

Thus, each mast 12 is connected to the central post 16, to a lateral post 18, and to one surface of a wall 20, via the respective guidance means 24.

Means of fixation 29 to the structural part 15 of the underwater vehicle are connected to the support 14.

Figure 2:
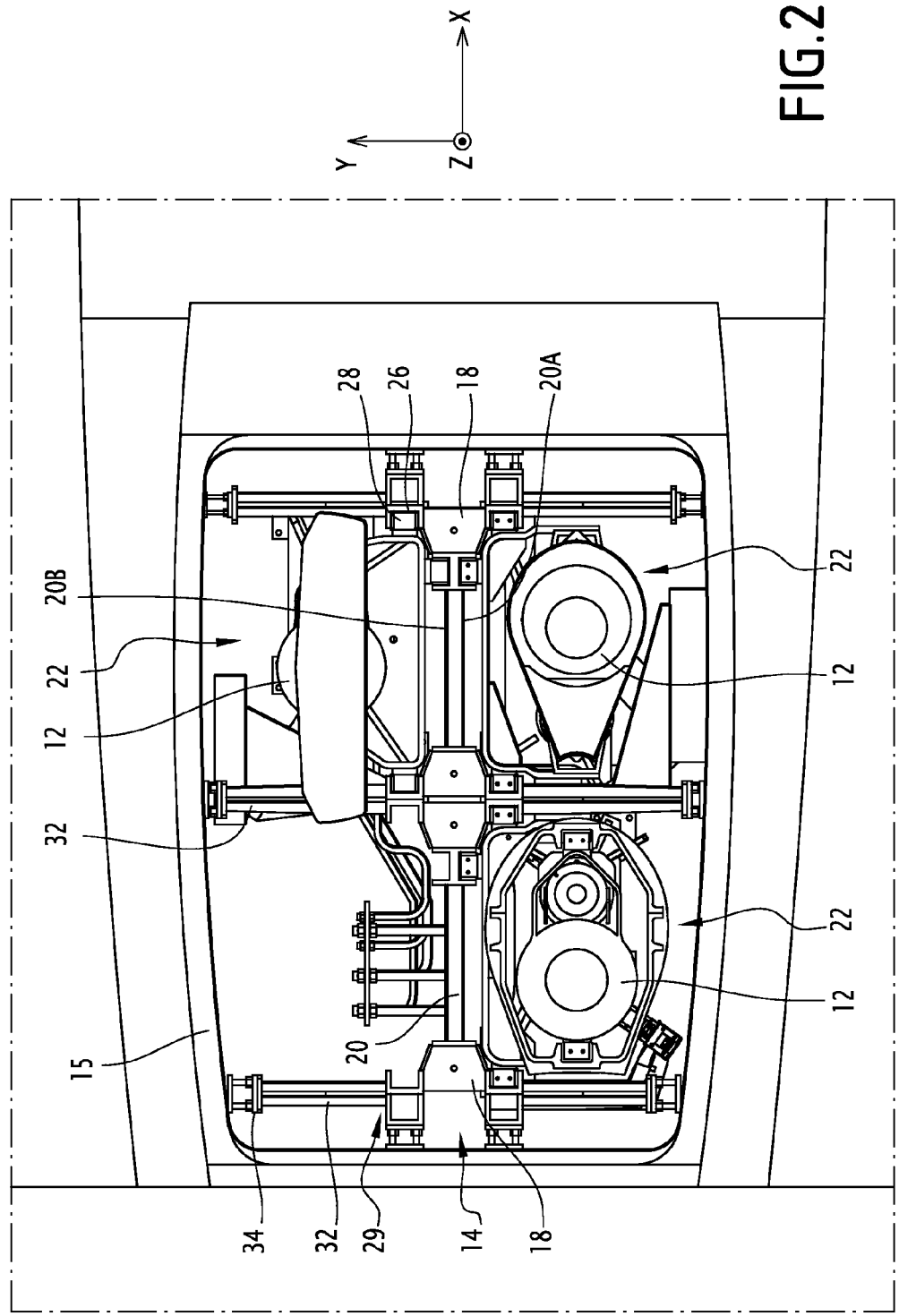
FIG. 2 is a transverse cross-section of the assembly of FIG. 1, affixed to a structural part of the underwater vehicle.

The fixation means 29 includes, e.g., mount brackets 32, each having a first end integrated with a central 16 or lateral post 18, and a second, free, end, to be affixed to the structural part 15 of the underwater vehicle, as shown in FIG. 2. To this end, each mount bracket 32 includes, on its second end, a classical fixation element 34.

It should be noted that the housings 22 delimited by the support 14 are open on all planes perpendicular to the raising direction Z, because this support 14 consists only of the posts 16, 18 and the walls 20.

Thus, taking into account, for each housing 22, a second, horizontal direction Y, perpendicular to the wall 20, it is possible to provide for the mast 12 to extend beyond the posts 16, 18 in this second direction Y. It should be noted that the support 14 then has a size smaller than that of the mast 12 in this second direction Y.

It is thus clear that a support 14 according to the invention is less cumbersome than a prior-art support, which transversely surrounds the mass, and thus extends beyond the mast in all directions perpendicular to the raising direction Z.

It should be noted that the invention is not limited to the embodiment described above.

DETAILED DESCRIPTION OF THE PREFERRED EMBODIMENT

In particular, the assembly may include several aligned central posts so as to further delimit housings for the masts. For example, the support 14 could include two central posts and two lateral posts, all aligned with one another, and walls extending between these posts, together delimiting six housings.

Of course, it is possible to provide housings 22 that include no mast, as shown in FIG. 2. In this case, a free housing 22 may be used to house various equipment, e.g., hydraulic equipment for raising the masts housed in the other housings.

The invention claimed is:

1. A support and guidance structure for raisable masts of an underwater vehicle, comprising:
    a support equipped with a guidance device configured to guide at least two masts in translation in a raising direction, said support delimiting a respective housing for each of the masts, and
    a fixation device configured to fix the support and guidance structure to a structural part of the underwater vehicle,
    wherein the support comprises at least one central post and two lateral posts and two walls each extending between the central post and one of the two lateral posts, whereby the central and lateral posts are aligned in a horizontal direction perpendicular to the raising direction and to a second direction, such that each housing is open on all planes perpendicular to the raising direction on all sides other than said posts and walls.

2. The support and guidance structure according to claim 1, wherein each pair of adjacent posts delimits one of the aforementioned housings.

3. The support and guidance structure according to claim 1, in which each wall has a first surface, bearing a guidance mechanism in translation of a mast, and a second surface, opposite the first, bearing a guidance mechanism in translation of another mast.

4. The support and guidance structure according to claim 2, in which each central post comprises a guidance mechanism configured to guide at least three masts in translation.

5. The support and guidance structure according to claim 2, in which each lateral post comprises a guidance mechanism configured to guide at least one mast in translation.

6. The support and guidance structure according to claim 1, in which the fixation device comprises mount brackets, each having a first end integrated with the support, and a second, free, end, to be affixed to the structural part of the underwater vehicle.

7. An assembly of a support and guidance structure and at least two raisable masts, wherein the support and guidance structure comprises:
    a support equipped with a guidance device configured to guide at least two masts in translation in a raising direction, said support delimiting a respective housing for each of the masts,
    a fixation device configured to fix the support and guidance structure to a structural part of the underwater vehicle,
    wherein each housing is open, on all planes perpendicular to the raising direction, in a second direction perpendicular to said raising direction,
    wherein each guidance device includes a guide rail, arranged on the support and extending in the raising direction, and in which each mast has, for each guide rail of the mast, at least one additional guide element to operate in tandem with the rail, and
    wherein the support comprises at least one central post and two lateral posts, and two walls each extending between the central post and one of the two lateral posts, whereby the central and lateral posts are aligned in a horizontal direction perpendicular to the raising direction and to the second direction.

8. An underwater vehicle comprising a structural part configured to receive at least one raisable mast, and an assembly of a support and guidance structure, wherein the support and guidance structure comprises:

a support equipped with a guidance device configured to guide at least two masts translation in a raising direction, said support delimiting a respective housing for each of the masts, and a fixation device configured to fix the support and guidance structure to a structural part of the underwater vehicle, wherein each housing is open, on all planes perpendicular to the raising direction, in a second direction perpendicular to said raising direction, wherein each guidance device comprises a guide rail, arranged on the support and extending in the raising direction, wherein each mast has, for each guide rail of the mast, at least one additional guide element to operate in tandem with the rail, wherein the support is affixed to the structural part, and wherein the support comprises at least one central post and two lateral posts, and two walls each extending between the central post and one of the two lateral posts, whereby the central and lateral posts are aligned in a horizontal direction perpendicular to the raising direction and to the second direction.

9. The support and guidance structure according to claim 2, in which each central post comprises a guidance mechanism configured to guide at least four masts in translation.

10. The support and guidance structure according to claim 2, in which each lateral post comprises a guidance mechanism configured to guide at least two masts in translation.

11. An assembly of a support and guidance structure, and at least two raisable masts, wherein the support and guidance structure comprises:

a support equipped with a guidance configured to guide at least two masts in translation in a raising direction, said support delimiting a respective housing for each of the masts, and a fixation device configured to fix the support and guidance structure to a structural part of the underwater vehicle, wherein each housing is open, on all planes perpendicular to the raising direction, in a second direction perpendicular to said raising direction, wherein each guidance device includes a guide rail, arranged on the support and extending in the raising direction, wherein each mast has, for each guide rail of the mast, at least one additional guide element to operate in tandem with the rail, and wherein, for each housing, the support has a size smaller than that of the mast in the second direction.

* * * * *